F. I. JOHNSON.
WHEEL TIRE.
APPLICATION FILED APR. 25, 1918.

1,286,334.

Patented Dec. 3, 1918.

Inventor
F. I. Johnson
By Attorney
Geo. H. Kennedy

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

WHEEL-TIRE.

1,286,334.     Specification of Letters Patent.     Patented Dec. 3, 1918.

Application filed April 25, 1918. Serial No. 230,709.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Wheel - Tires, of which the following is a specification, accompanied by drawings forming a part of the same.

My invention relates to that class of resilient wheels employed upon vehicles, such as automobiles, motor trucks, and the like, and it has for its object to secure the desired resiliency without the use of pneumatic tires. I accomplish these objects by the construction and arrangement of parts as hereinafter described, the novel features being pointed out in the annexed claims.

Referring to the accompanying drawings.

Similar reference characters refer to similar parts in the different views.

Figure 1:
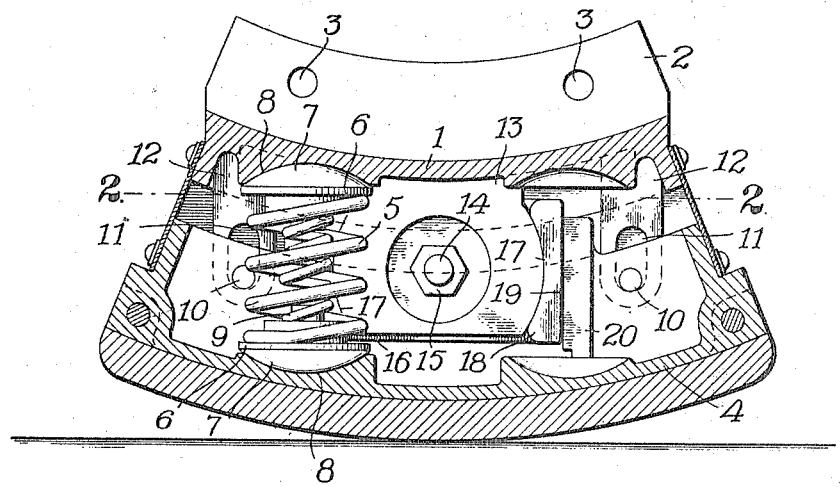
Figure 1 represents in central sectional view a portion of a wheel tire embodying my invention.
Figure 2:
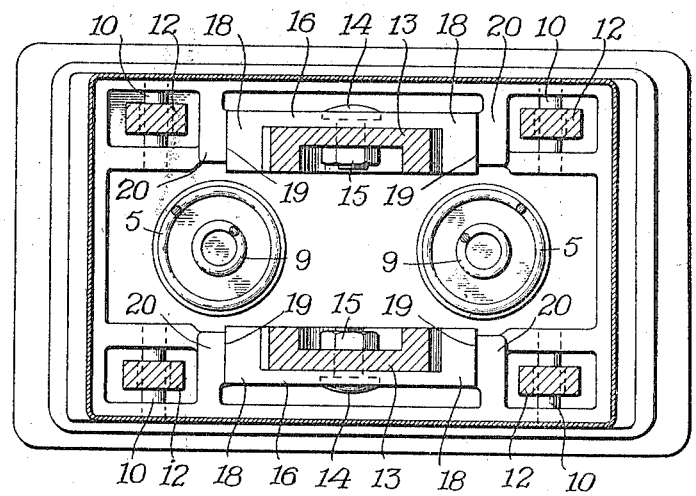
Fig. 2 is a plan view of the same shown in section on the plane of the broken line 2—2, Fig. 1.

My improved wheel tire comprises a series of separated sections arranged around the rim of the wheel, of which one is shown in sectional view in the accompanying drawings. The sections are duplicates of each other and comprise a rim plate 1, provided with flanges 2, adapted to inclose the sides of the wheel rim and be attached thereto by bolts passing through holes 3, 3. Mounted upon the rim plate 1 is a tread plate 4. Between the rim plate 1 and tread plate 4 are interposed springs 5, 5 one of which is shown in Fig. 1, the remaining spring being removed from Fig. 1 in order to disclose more clearly the construction of the tire. The springs 5, 5, are provided at their opposite ends with heads 6, 6, having outer convex surfaces 7, 7, seated in concave recesses 8, 8, in the rim plate and tread plate, respectively.

Inclosed within the springs 5, 5, and held concentrically therein are springs 9, 9. The expansion of the springs 5, 5, and 9, 9, is exerted to force the tread plate 4 radially outward with a yielding pressure which provides the desired resilience to the tire section. Held in the tread plate 4 are bolts 10, four in number, and placed near the corners of the tread plate. The bolts 10 pass through slots 11 in lugs 12 projecting from the rim plate 1. The bolts 10 limit the outward movement of the tread plate 4 as it is subjected to the expansion of the springs, and the slots 11 permit an inward movement of the tread plate 4 toward the rim plate 1 as the tire section supports the load. Projecting from the center of the rim plate 1 and on opposite sides thereof are the lugs 13, 13. By means of bolts 14 and nuts 15 I attach shoes 16 to the sides of the lugs 13. The edges of the lugs 13 are convex, as shown at 17, the convex sides 17 being concentric with the bolt 14. The shoes 16 are provided with flanges 18, 18, which overlap and fit the convex edges of the lugs 13. The opposite ends or outer walls 19 of the flanges 18 are straight and abut lugs 20 projecting from the tread plate 4.

The above described construction of the lugs 13 and shoes 16 provides for the radial movement of the tread plate 4 toward and away from the rim plate 1 as the former is compressed by the pressure of the load and extended by the expansion of the interposed springs. The convex surfaces 17 of the lugs 13, which are concentric with the bolts 14 and fit the concave surfaces of the flanges 18, permit a rocking movement of the tread plate 4 about the bolt 14 as one or the other ends of the tread plate are compressed. The rotative movement of the wheel is imparted to the tread plate 4 through the lugs 13, carried by the rim plate 1 and flanges 18 of the shoes 16, which abut against the lugs 20 carried by the tread plate 4.

By the above described construction great flexibility of the tire section is permitted. As the wheel is rotated and the tire sections are successively brought beneath the rim of the wheel in position to support the load, one end of the tread plate is first compressed as it is brought into contact with the ground, causing a rocking movement about the bolt 14, during which the convex surfaces 17 slide upon the concave surfaces of the flanges 18. When the center of the tire section is brought into contact with the ground, and the pressure becomes radial, the flanges 18 slide upon the abutting surfaces of the lugs 20. As the tire section leaves the ground its opposite end becomes compressed and a rotative movement of the lugs 13 within the shoe flanges 18 takes place in the opposite direction. When the tire section has left the ground, the force of the interposed springs is exerted to press the tread plate 4 outwardly, its outward movement being limited by the bolts 10 passing through the slots 11 of the lugs 12. During the movement of the tread plate as above described the heads 6 carried by the interposed springs are permitted a slight movement in the concave recesses 8.

I claim,

1. A wheel tire comprising a resilient section having a rim plate, a tread plate, interposed springs between the tread plate and the rim plate, a lug projecting radially from the rim plate, opposite the central portion of the tread plate, provided with convex edges in the plane of the wheel, a shoe pivotally attached to said lug provided with flanges overlapping and fitting the convex sides of said lug, and lugs on said tread plate having straight sides abutting the oposite ends of said shoe.

2. A wheel tire comprising a resilient section having a rim plate, a tread plate, springs interposed between the tread plate and the rim plate, means for limiting the outward movement of the tread plate, and means for imparting the rotative movement of the wheel to the tread plate, consisting of a lug projecting radially from the rim plate, a shoe pivotally attached to the side of said lug, flanges on said shoe overlapping and contacting the edges of said lug, said contacting surfaces being concentric with the pivotal axis of the shoe, and lugs carried by the tread plate and contacting with opposite ends of said shoe.

3. A wheel tire comprising a resilient section having a rim plate, a tread plate, springs interposed between the tread plate and the rim plate, means for limiting the outward movement of the tread plate, and means for imparting the rotative movement of the wheel to the tread plate comprising a lug carried by the rim plate, a shoe pivotally attached to said lug, and lugs carried by the tread plate and abutting the ends of said shoe.

4. In a wheel tire of the kind classified, a series of tread plates arranged around the periphery of the rim of the wheel, means for imparting the rotative movement of the wheel rim to each of said tread plates, said means comprising lugs carried by the wheel rim, shoes pivoted on said lugs and contacting with said lugs in the plane of the wheel, and lugs on said tread plates contacting with said shoes.

Dated this twenty-second day of April, 1918.

FREDERIC I. JOHNSON.

Witnesses:
MINNIE BRITTON STODDARD,
GEO. H. KENNEDY, Jr.

Copies of this patent may be obtained for five cents each, by addressing the "Commissioner of Patents, Washington, D. C."